United States Patent [19]
Denman

[11] Patent Number: 5,784,585
[45] Date of Patent: Jul. 21, 1998

[54] COMPUTER SYSTEM FOR EXECUTING INSTRUCTION STREAM CONTAINING MIXED COMPRESSED AND UNCOMPRESSED INSTRUCTIONS BY AUTOMATICALLY DETECTING AND EXPANDING COMPRESSED INSTRUCTIONS

[75] Inventor: Paul W. Denman, Bedfont, Great Britain

[73] Assignee: Motorola, Inc., Schaumburg, Ill.

[21] Appl. No.: 765,675

[22] PCT Filed: Apr. 5, 1995

[86] PCT No.: PCT/GB95/00787

§ 371 Date: Jan. 7, 1997

§ 102(e) Date: Jan. 7, 1997

[87] PCT Pub. No.: WO95/27244

PCT Pub. Date: Oct. 12, 1995

[30] Foreign Application Priority Data

Apr. 5, 1994 [GB] United Kingdom .................. 9406666

[51] Int. Cl.[6] ............................................... G06F 9/318
[52] U.S. Cl. ............................................ 395/385; 395/389
[58] Field of Search ..................................... 395/384, 385, 395/386, 389

[56] References Cited

U.S. PATENT DOCUMENTS

| 4,633,388 | 12/1986 | Chiu ........................................... 395/384 |
| 5,057,837 | 10/1991 | Colwell et al. ............................. 341/55 |
| 5,632,024 | 5/1997 | Yajima et al. ............................... 395/381 |
| 5,652,852 | 7/1997 | Yokota ........................................ 395/384 |

FOREIGN PATENT DOCUMENTS 417013A  3/1991  European Pat. Off. .

OTHER PUBLICATIONS

Patent Abstracts of Japan, vol. 018, No. 153 (P-1709), Mar. 14, 1994 & JP, A, 05 324314 (Hitachi Ltd), Dec. 7, 1993.
IBM Technical Disclosure Bulletin, vol. 32, No. 10A, Mar. 1, 1990, p. 349 XP 000083346 'Opcode Remap and Compression in Hard-Wired Risc Microprocessor'.
IBM Technical Disclosure Bulletin, vo. 15, No. 3, Aug. 1972, New York, US, p. 920, J.C. Kemp, 'Instruction Translator'.
Patent Abstracts of Japan, vol. 006, No. 075 (P-114), May 12, 1982 & JP, A 57 013549 (NEC Corp.) Jan. 23, 1982.
Patent Abstracts of Japan, vo. 016 No. 547 (P-1452), Nov. 17, 1992 & JP, A, 04 2054271 (Matsushita Electric and Co. Ltd.) Jul. 27, 1992.

*Primary Examiner*—Richard L. Ellis
*Attorney, Agent, or Firm*—Rolland R. Hackbart

[57] ABSTRACT

In a computer system with a RISC processor (14) using 32-bit instructions, certain instructions are stored in 16-bit compressed form and expanded for use by the processor, reducing their fetch time. An instruction is extracted from memory (via bus 10) via a set of buffers (11-1 to 11-4) which are loaded sequentially with 8-bit or 16-bit words. The instruction format includes a condition field in ins first word, defining the conditions for executing the instruction. An NV (=Never) code in that field indicates that the instruction is not to be executed; this code (which is not normally utilized) issued to identify compressed instructions. A compressed instruction detector unit (18) expands the compressed instruction; and the detector (18) controls a multiplexer (13) to pass either expanded instructions therefrom or full-length instructions direct from the buffers (11-1 to 11-4) to the processor (14). A packer state machine unit (17) terminates the fetching of the instruction once its 16 bits have been fetched.

4 Claims, 2 Drawing Sheets

COMPUTER SYSTEM FOR EXECUTING INSTRUCTION STREAM CONTAINING MIXED COMPRESSED AND UNCOMPRESSED INSTRUCTIONS BY AUTOMATICALLY DETECTING AND EXPANDING COMPRESSED INSTRUCTIONS

The present invention relates to computer systems, and more specifically to systems in which the memory bus width is less than the word width used by the processor.

The present invention finds particular application in RISC systems (RISC standing for Reduced Instruction Set Computer), although it is not restricted to such systems. RISC systems are so called in contrast to systems based on conventional microprocessors such as the well-known 80286, 80386, and 80486 microprocessors, which are called CISC (Complex Instruction Set Computer) processors.

RISC is a design or system which uses instructions which are generally simpler than the instructions used by CISC systems. The intention of the RISC design is that the gain in the execution time of individual instructions should outweigh the loss of speed due the increased number of instructions. One of the features used in RISC designs to achieve increased speed is that the amount of processing of instructions should be reduced, and one technique used to achieve this is to use long instructions, so that many of the bits and fields in the instructions can be used directly instead of having to be decoded. For similar reasons of speed and for general convenience, RISC systems also tend to. use a relatively long data word length, matching the instruction word length. Thus one well-established RISC system is the ARM (Advanced RISC Machine) core (ie processor), which is a 32-bit system.

Memories and memory access buses are however normally relatively narrow (short in terms of word length), typically 8 or 16 bits. Wide memory systems and buses are of course possible, but for a variety of reasons (including the fact that wide memories are relatively expensive), are relatively uncommon. It is therefore not unusual for a computer system to comprise an 8 or 16 bit wide memory coupled to a 32-bit processor.

This obviously involves a mismatch between the memory width and the processor word width. This mismatch is normally overcome by the use of buffer latches. A set of four 8-bit latches is coupled to an 8-bit or 16-bit memory bus and to a 32-bit processor bus; data is loaded into the latches and read from them on the memory side in 4 cycles of 8-bit words or 2 cycles of 16-bit words, and is loaded into and read from them on the processor side in single 32-bit word cycles.

The general object of the present invention is to provide, in a system in which the memory bus width is less than the word width used by the processor, an improvement in the matching of the memory and processor buses.

According to the present invention there is provided a computer system comprising a memory, a processor, means for passing instructions from the memory to the processor, and compressed instruction pre-processing means for expanding compressed instructions, characterized in that the compressed instruction pre-processing means comprise:

a compressed instruction detector circuit which detects a predetermined bit combination in an instruction coming from the memory;

a compressed instruction decoder which expands a compressed instruction to full length; and a multiplexer which, under the control of the compressed instruction detector circuit, passes either the original instruction or the output of the compressed instruction decoder to the processor.

A system is known, from JP 5 324 314 A, Hitachi (Patent Abstracts of Japan, vol 018, no 153 (P-1079), 14.03.94), in which the memory space occupied by a program is reduced by compressing the instructions (using a public compression algorithm). In that system, the entire program (ie all instructions) is decompressed between the memory and the instruction register.

The main systems to which the present invention is applicable have two characteristics, relating to the instruction format and the way instructions are extracted from memory. The instruction format for the processor includes a condition field the contents of which indicate the conditions under which the instruction is executed; one of the codes which the condition field can include is an NV code indicative that the instruction is not to be executed (NV=Never). An instruction is extracted from memory, ie passed from the memory bus to the processor, via a set of buffers which are loaded sequentially with words from the memory (via the memory bus). The condition field is included in an early word (ie not the last word) from the memory (in fact, the first word).

In such systems, the NV code is not normally used; that is, programs do not normally include instructions with this code. Such instructions would merely act as NOP (no operation) instructions and be ignored; including them would serve no useful purpose, but merely waste execution time and memory space.

The present system provides means for detecting, in such systems, the NV code in the buffers, and means responsive thereto for expanding a compressed instruction in the buffers to a full-length instruction. (More generally, there must be some instruction which is normally unused and can therefore have its function changed for use as a compressed instruction.) The fetch of a compressed instruction requires only half as many memory cycles as the fetch of a full 32-bit instruction. The system therefore runs faster; and the increase in speed is enhanced if the memory cycle time is larger than the processor cycle time, as will often be the case.

A computer system embodying the invention will now be described, by way of example, with reference to the drawings, in which.

Figure 1:
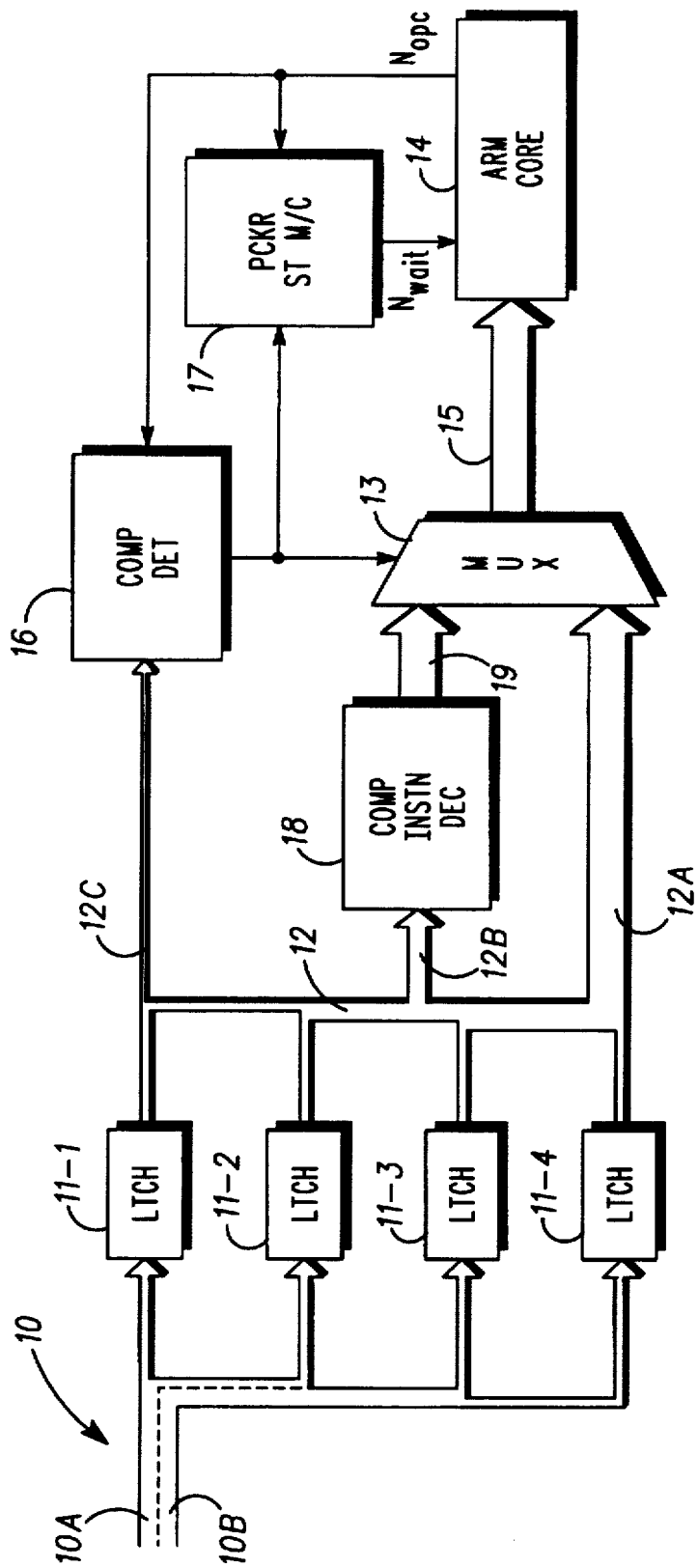
FIG. 1 is a block diagram of the system.

Referring to FIG. 1, the system comprises a memory bus 10 coupled to a 32-bit ARM microprocessor unit ARM CORE 14 via a set of buffer latches 11. Depending on the particular memories to which the memory bus is intended to be coupled, the memory bus 10 may be an 8-bit bus 10A or a 16-bit bus comprising two 8-bit channels or sub-buses 10A and 10B. In the particular system shown, this bus is a 16-bit bus which can be used to carry either 8-bit or 16-bit words, so that it can have either 8-bit or 16-bit memories (or both) coupled to it.

It should be noted that only those parts of the system dealing directly with the transfer of instructions from the memory to the processor are shown and described. Obviously the system will also have parts dealing with eg the transfer of operand words (which will also generally travel over parts of the memory bus 10), but these are not relevant for present purposes and are not shown.

The latches 11 consist of 4 8-bit latch units LTCH 11-1 to 11-4. In normal operation, these are loaded from the memory (not shown) either by means of 2 sequential 16-bit words, the first word being fed into latches 11-1 and 11-2 and the second into latches 11-3 and 11-4, or by means of 4 8-bit words which are sequentially fed into latches 11-1, 11-2, 11-3, and 11-4. The 8-bit outputs of these latches are combined into a 32-bit instruction bus 12A which passes through a multiplexer MUX 13 to become an instruction bus 15 which is coupled to the ARM core 14.

The instruction length for the ARM core 14 is 32 bits, matching the width of the instruction bus 12A and 15. The instruction format for this processor includes a Condition field occupying the top 4 bits (D31-28, ie bits 31 to 28 in the word, with the bits identified as D31 to D0). The code which this field can contain is effectively appended to the op code (operation code) in the instruction, to cause or modify the execution of the instruction in dependence on the condition specified; typical condition codes are Equal, Not equal, Negative, Overflow, Less than, and Always. The next part of the instruction is what may be termed the op-code code proper; all the usual op-codes like Add, Load, Shift, Branch, and so on are provided. The remainder of the instruction is divided into further fields, in ways which may depend on the particular op-code, defining eg an offset, a memory data address, a shift parameter, immediate data values, etc.

Of the total of 16 possible condition codes in bits D31-28, 15 are meaningful. The 16th is Never (NV), which means that the instruction is not performed—that is, there are no conditions under which the instruction is performed. This NV code is in fact 1111. As noted above, this condition code is not normally used. In the present system, this condition code is used, but for a different purpose. (This means that in the present system, the NV condition code must not be used for its normal purpose of indicating an instruction which is not to be performed in any conditions. If a program should include instructions using the NV condition code, these can be replaced by NOP (no operation) instructions.)

The latches 11-1 to 11-4 store the bytes of the full 32-bit instruction word in byte order, with the top byte (D31-24) in latch 11-1, down to the bottom byte (D7-0) in the word in latch 11-4. The condition code is therefore stored in the top 4 bits in latch 11-1. These 4 bits are taken from the output of this latch as a 4-bit bus 12C, which is fed to a compressed instruction detector circuit COMP DET 16. The circuit 16 includes a 4-bit AND gate, fed with bits D31-28 on bus 12C, and therefore detects when a compressed instruction is encountered.

The ARM core 14 generates a signal Nopc (Not op-code fetch) when (in simplified terms) it is not calling for an instruction, ie either it is performing an internal cycle or data is being transferred. Circuit 16 is enabled when the signal Nopc is low, ie when the ARM core requires an instruction.

A packer state machine circuit PCKR ST M/C 17 controls the multiple memory accesses required to extract, onto the memory bus 10, the 2 or 4 successive memory words which together constitute a 32-bit instruction word. This circuit thus normally causes latch 11-1 (for 8-bit memory words) or latches 11-1 and 11-2 (for 16-bit memory words) to be loaded first, followed by the remaining 3 or 2 latches (in 3 further cycles or a single further cycle respectively).

The packer state machine circuit 17 generates a control signal Nwait (Not wait) which is fed to the ARM core 14 to indicate when the instruction being fetched is available. This signal normally changes to indicate that the instruction is available when the last buffer 12-4 has been filled (ie after the 4th memory cycle (for 8-bit memory words) or 2nd memory cycle (for 16-bit memory words) has been completed. In the present system, the output of circuit 16 is also passed to the packer state machine circuit 17, and this circuit 17 changes the signal Nwait as soon as the first two latches 11-1 and 11-2 have been loaded if the instruction is a compressed instruction. The circuit 17 also aborts the loading of the latches 11-3 and 11-4, since the instruction which is being fetched is generated solely from the contents of the top 2 latches 11-1 and 11-2 if the instruction is a compressed instruction.

The detection of a compressed instruction is achieved as soon as latch 11-1 is loaded; that is, as soon as the first memory word has been read. If the memory word length is 16 bits, then latch 11-2 will have been loaded at the same time as latch 11-1; if the memory word length is 8 bits, the latch 11-2 will be loaded on the next memory cycle.

The 16 bits of latches 11-1 and 11-2 together are combined into a 16-bit bus 12B, which is fed to a compressed instruction decoder circuit COMP INSTN DEC 18. If the instruction is a compressed instruction, these two latches contain the entire instruction, in compressed form. The function of the circuit 18 is to decompress the instruction, ie to expand it into a 32-bit instruction in the standard format.

For a normal instruction, the (32-bit) instruction is available on bus 12A; for a compressed instruction, the decompressed (32-bit) instruction is available on bus 19. These two buses are fed to the multiplexer 13, which is controlled by the output of the compressed instruction detector circuit 16. Thus for a normal instruction, that instruction will be passed from bus 12A to the instruction input bus 15 of the ARM core 14; for a compressed instruction, that instruction will be passed (in its decompressed form) from bus 19 to bus 15. (For a normal instruction, the circuit 18 will produce nonsense, but its output will not be passed through the multiplexer and will thus have no effect.)

The compressed instruction decoder circuit 18 has to generate a 32-bit instruction from the 16 bits of the compressed instruction (and of those 16 bits, the top 4 are 1111). The number of instructions which can be compressed is therefore relatively small, both in the number of op-codes which can be used for compression and in the parameters which the compressed instructions can have when decompressed. The instructions chosen for compression should therefore be selected as instructions which are likely to be used frequently (to achieve the maximum effect on speeding up the system), and those for which the number of options or parameter sizes are relatively small. (However, if an instruction of compressible type should have a parameter which out of the compressible range, the instruction can simply be used in its normal (uncompressed) form.)

The instruction type which is selected for compression in the present system is the branch instruction. This has a condition field which is either (branch on) Zero or Non-zero (0000 or 0001), an op-code (D27-25) of 101, a direction bit (D24) which defined the direction of the branch, and a 24-bit offset (D23-0) which defines the distance of the branch.

In compressed form, bits D31-28 are 1111 (the condition code field used to indicate a compressed instruction), bit D27 indicates a branch instruction, bit D26 indicates whether the condition field should be branch on Zero or branch on Non-zero, bit D25 indicates the direction of the branch, and bits D24-16 indicate the distance of the branch. To decode this, if bit D27 is 0, bits D27-24 must be set to 1010; bits D31-28 must be set to 0000 or 0001 in dependence on bit D26 (0 or 1); bits D23-9 must be set to all is or all 0s in dependence on bit D25 (0 or 1); and bits D8-0 must be set to bits D24-16. (Output bits D23-9 effectively fill out the distance field D8-0 from 9 to 24 bits; for a forward direction, they are simply 0s, but for a backward direction, they must be all is to make the possible distances match the possible forward distances.)

Figure 2:
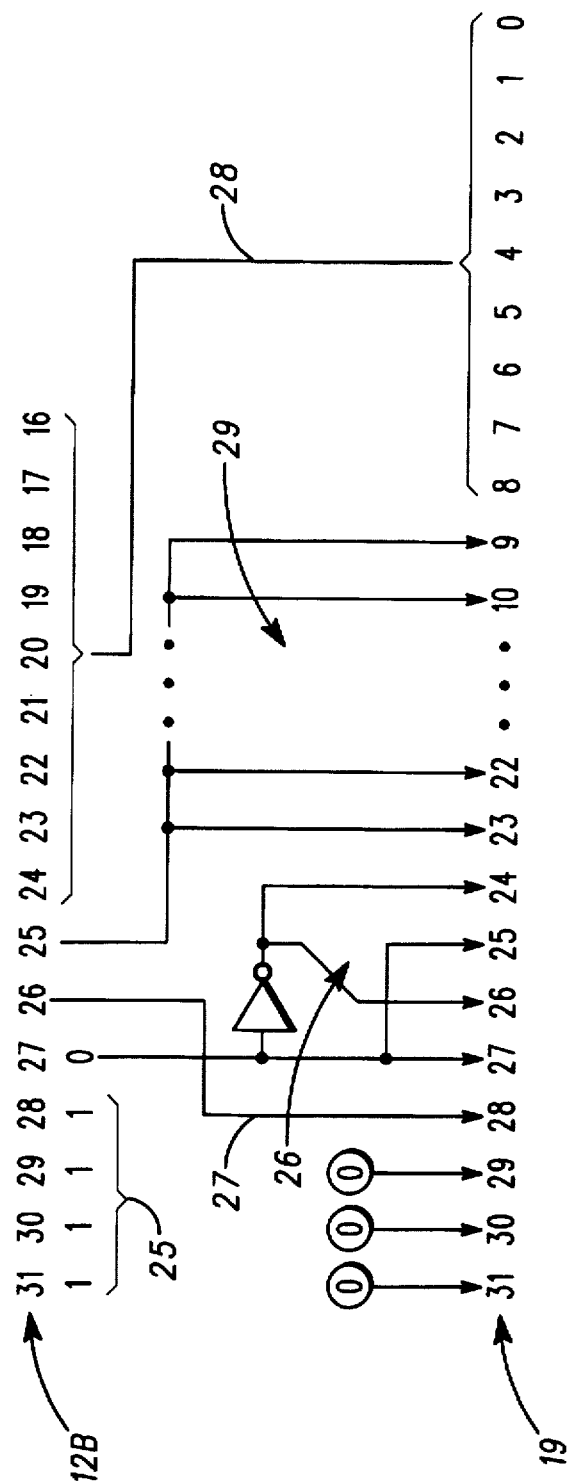
FIG. 2 is a stylized diagram of the compressed instruction decode circuit of the system.

FIG. 2 shows, in simplified and abstract form, a logic circuit which achieves this. The top line shows the input bits of the compressed instruction on bus 12B; the bottom row shows the output bits of the expanded instruction on bus 19.

As shown at 25, the top 4 input bits D31-28 of the compressed instruction are 1111; this bit combination is recognized by the compressed instruction detector circuit 16. Input bit D27 is 0, indicating that the compressed instruction is a branch instruction; this is coupled, via circuit 26, to output bits D27-24 to generate the bit pattern 0101 (the branch op-code) on those bits. Output bits D31-29 are forced to 1 and input bit D26 is coupled by a line 27 to output bit D28 to generate the condition code 0000 or 0001. Input bits D24-16 are coupled by lines 28 to output bits D8-0, so that the pattern of these input bits is copied directly to these output bits. Input bit 25 is coupled by circuitry 28 to output bits D23-9; the circuitry 29 coupled this input bit to all these output bits.

If further instruction types (op-codes) are to be selected for compression, the circuitry of the compressed instruction decoder circuit 18 must of course be expanded. It will also be necessary to include, in the compressed instruction, a code indicative of the op-code. For each op-code, there will be a respective set of decoding circuits (though in some cases it may be possible for some of the component circuits to be shared between different op-codes). An op-code detector and decoder will also be required, for recognizing the op-code and selecting the corresponding set of decoding circuits. (In the system as described, bit D27 can be used to distinguish the branch op-code (D27=1) from another op-code; this allows one further op-code (identified in the compressed form by D27=0) to be used.)

The compressed instruction decoder circuit 18 may be constructed using logic circuits, using eg ASIC techniques. Alternatively or additionally, the compressed instruction decoder circuit 18 may use table look-up techniques.

The compressed instruction detector circuit 16, the packer state machine circuit 17, the compressed instruction decoder circuit 18, and the multiplexer 13 have been described and shown as distinct units separate from the processor (ARM core) 14. It will however be realized that these circuits, or some and/or some parts of them, may be regarded as incorporated in or part of the processor 14.

I claim:

1. A computer system comprising a memory (on bus 10), a processor (14), means for passing instructions from the memory to the processor, and compressed instruction pre-processing means (13, 16, 18) for expanding compressed instructions, characterized in that the compressed instruction pre-processing means comprise:

a compressed instruction detector circuit (16) which detects a predetermined bit combination (25) in an instruction coming from the memory;

a compressed instruction decoder (18) which expands a compressed instruction to full length; and a multiplexer (13) which, under the control of the compressed instruction detector circuit (16), passes either the original instruction or the output of the compressed instruction decoder (18) to the processor (14).

2. A computer system according to claim 1, characterized in that the predetermined bit combination comprises a NV (never) code in the condition field in the instructions.

3. A computer system according to claim 1 or 2, characterized by a packer state machine (17), coupled to the processor (14) and the compressed instruction detector circuit (16), which signals to the processor (14) as soon as the instruction is available.

4. A computer system according to claim 1 or 2, characterized in that the compressed instruction decoder expands an address offset field in the instruction.

* * * * *